US006933674B2

(12) United States Patent
Im et al.

(10) Patent No.: US 6,933,674 B2
(45) Date of Patent: Aug. 23, 2005

(54) PLASMA DISPLAY PANEL UTILIZING CARBON NANOTUBES AND METHOD OF MANUFACTURING THE FRONT PANEL OF THE PLASMA DISPLAY PANEL

(75) Inventors: Seoung-jae Im, Seoul (KR); Young-jun Park, Kyungki-do (KR); Gi-young Kim, Chungcheongbuk-do (KR)

(73) Assignee: Samsung SDI Co., Ltd., Suwon (KR)

( * ) Notice: Subject to any disclaimer, the term of this patent is extended or adjusted under 35 U.S.C. 154(b) by 227 days.

(21) Appl. No.: 10/412,420

(22) Filed: Apr. 14, 2003

(65) Prior Publication Data

US 2003/0193291 A1 Oct. 16, 2003

(30) Foreign Application Priority Data

Apr. 12, 2002 (KR) .......................................... 2002-19968

(51) Int. Cl.[7] ................................................. H01J 17/49
(52) U.S. Cl. ....................... 313/582; 313/586; 313/587; 313/584; 315/169.4
(58) Field of Search ............................... 313/581–587; 315/169.4

(56) References Cited

U.S. PATENT DOCUMENTS 6,346,775 B1 * 2/2002 Lee et al. ................ 315/169.3

FOREIGN PATENT DOCUMENTS

| EP | 1 122 759 A2 | 8/2001 |
|---|---|---|
| KR | 010039031 A | 5/2001 |
| KR | 10-2001-0039031 | 5/2001 |
| WO | WO 01/31673 A1 | 5/2001 |

OTHER PUBLICATIONS

Notice to Submit Response, issued by the Korean Patent Office on Apr. 21, 2004, Application No. 101–2002–0019968.

* cited by examiner

*Primary Examiner*—Joseph Williams
*Assistant Examiner*—Elizabeth Rielley
(74) *Attorney, Agent, or Firm*—Burns, Doane, Swecker & Mathis, L.L.P.

(57) ABSTRACT

A plasma display panel using carbon nanotubes is provided. In the front panel of the plasma display panel, transparent electrodes are formed as strips on the glass substrate. Bus electrodes are each formed as strips along the outer edge on the upper surface of each of the transparent electrodes and in parallel to the transparent electrodes. A dielectric layer is formed on part of the glass substrate, parts of the transparent electrodes, and the bus electrodes. Carbon nanotube strips are aligned on the dielectric layer such that the carbon nanotube strips face the transparent electrodes. A protective layer is formed on part of the dielectric layer and the carbon nanotube strips. Accordingly, the secondary electron emission characteristic is improved, resulting in a high-quality display screen having a high luminous efficiency and a high contrast ratio.

4 Claims, 6 Drawing Sheets

US 6,933,674 B2

PLASMA DISPLAY PANEL UTILIZING CARBON NANOTUBES AND METHOD OF MANUFACTURING THE FRONT PANEL OF THE PLASMA DISPLAY PANEL

BACKGROUND OF THE INVENTION

This application claims the priority of Korean Patent Application No. 2002-19968, filed on Apr. 12, 2002, in the Korean Intellectual Property Office, the disclosure of which is incorporated herein in its entirety by reference.

1. Field of the Invention

The present invention relates to a plasma display panel and a method of manufacturing a front panel of the plasma display panel, and more particularly, to a plasma display panel using carbon nanotubes and a method of manufacturing a front panel of the plasma display panel.

2. Description of the Related Art

Plasma display panels display characters, graphics, or motion-pictures using visible rays emitted by the collision of ultraviolet rays emitted from plasma with phosphors, the plasma formed of gas discharged from the place between front and rear panels.

Plasma display panels are classified into a direct current type, an alternating current type, and a combination type of the two types, according to the electrode structure. Alternating current plasma display panels provide less damage to electrodes than direct current plasma display panels.

In order to manufacture the alternating current plasma display panels, X and Y electrodes for sustain discharge are installed on a glass substrate, which is a front panel on the display side, and an address electrode is installed on the rear panel at the opposite side in order to write data. Next, the two panels are sealed with each other, and the space between the two panels is exhausted of air and then injected with a discharge gas. The front panel is manufactured by the following steps of patterning a transparent electrode; forming a bus electrode; forming a transparent dielectric layer; and forming a protective layer.

In order to improve the luminescence efficiency of such a conventional plasma display panel, the invention disclosed in Korean Patent Publication No. 2001-39031 uses carbon nanotubes having high secondary electron emission characteristics for plasma display panels.

FIGS. 1 and 2 are cross sections of embodiments of the front panel of the plasma display panel disclosed in the aforementioned Korean patent. Referring to FIG. 1, in a first embodiment of the conventional front panel, sustain electrodes 12 are aligned on a glass substrate 10, and bus electrodes 14 are formed on the sustain electrodes 12. Furthermore, a transparent dielectric layer 16 is formed on the sustain electrodes 12 and the bus electrodes 14 by screen printing. Thereafter, a protective layer 18 is formed of carbon nanotubes on the upper surface of the dielectric layer 16.

Referring to FIG. 2, a second embodiment of the conventional front panel has the same structure as the first embodiment of FIG. 1 except that an MgO protective layer 19 is formed on the dielectric layer 16 and a protective layer 20 of carbon nanotubes is then formed on the MgO protective layer 19.

Such conventional plasma display panels significantly decreases the transmittance of visible rays due to coating of the entire front panel with opaque carbon nanotubes, rather degrading the luminescence efficiency. Particularly, the plasma display panel of FIG. 2 has difficulty in technically growing carbon nanotubes on the MgO protective layer 19.

SUMMARY OF THE INVENTION

To solve the above-described problems, it is an object of the present invention to provide a plasma display panel providing a high luminous efficiency by the use of carbon nanotubes that improve the secondary electron emission characteristic, and a method of manufacturing the front panel of the plasma display panel.

In order to achieve the above object of the present invention, the plasma display panel has a front panel including a glass substrate, transparent electrodes, bus electrodes, a dielectric layer, carbon nanotube strips, and a protective layer. The transparent electrodes are formed as strips on the glass substrate. The bus electrodes are each formed as strips along the outer edge on the upper surface of each of the transparent electrodes and in parallel to the transparent electrodes. The dielectric layer is formed on part of the glass substrate, parts of the transparent electrodes, and the bus electrodes. The carbon nanotube strips are aligned on the dielectric layer such that the carbon nanotube strips face the transparent electrodes. The protective layer is formed on part of the dielectric layer and the carbon nanotube strips.

Preferably, the area of the carbon nanotube strips is equal to or less than 10% of the area of the front panel, and the width of the carbon nanotube strips is about 70–100 $\mu$m.

The carbon nanotube strips are formed of one of single-wall carbon nanotubes and multi-wall carbon nanotubes.

In the method of manufacturing the front panel of a plasma display panel, first, transparent electrodes are formed as strips on a glass substrate. Bus electrodes are each formed as strips along the outer edge on the upper surface of each of the transparent electrodes and in parallel to the transparent electrodes. Part of the glass substrate, parts of the transparent electrodes, and the bus electrodes are coated with a dielectric layer. Carbon nanotube strips are printed on the dielectric layer such that the carbon nanotube strips face the transparent electrodes. A protective layer is formed on part of the dielectric layer and the carbon nanotube strips.

Preferably, in the carbon nanotube strips printing step, the carbon nanotube strips have an area equal to or less than 10% of the area of the front panel and a width of about 70–100 $\mu$m.

In the carbon nanotube strips printing step, the carbon nanotube strips are formed of one of single-wall carbon nanotubes and multi-wall carbon nanotubes.

Accordingly, the plasma display panel using carbon nanotubes having a good secondary electron emission characteristic improves the luminous efficiency and consequently increases the contrast ratio of a display screen, thus providing high-quality pictures.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
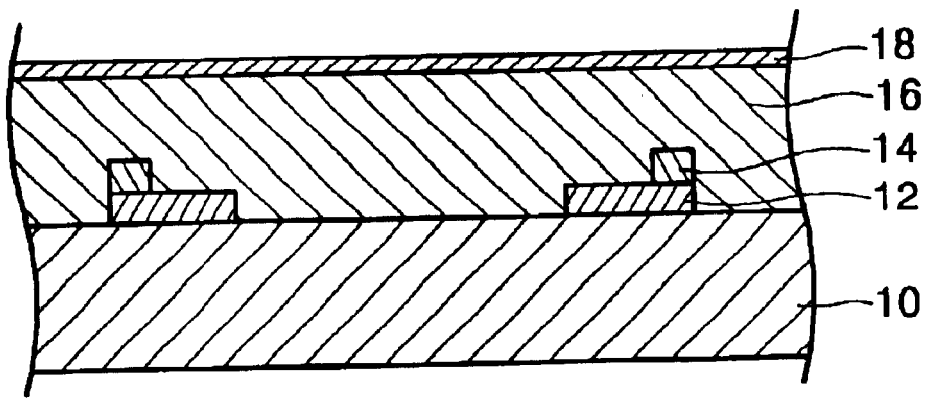
FIGS. 1 and 2 are cross sections of embodiments of a conventional plasma display panel disclosed in Korean Patent Publication No. 2001-39031.
Figure 2:
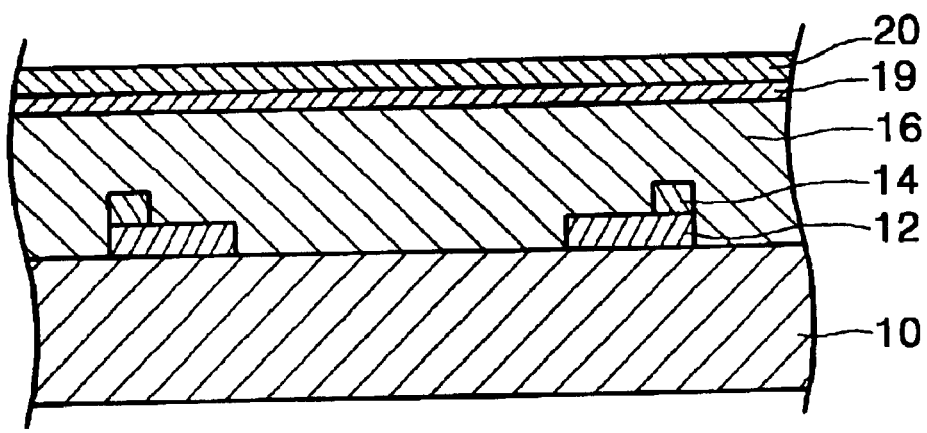

The present invention will now be described more fully hereinafter with reference to the accompanying drawings, in which preferred embodiment of the invention are shown. Like numbers refer to the like elements throughout, and the thickness and width of the elements in the drawings are exaggerated for clarity.

Figure 3A:
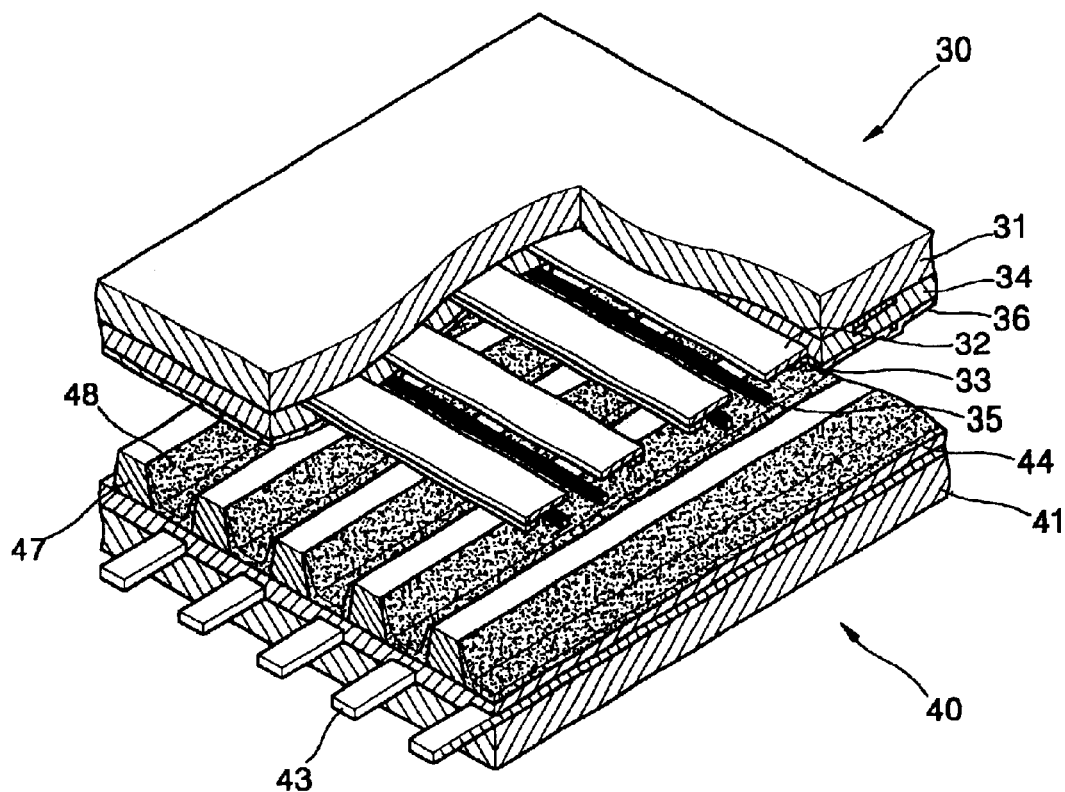
FIG. 3A is an open-cut perspective view of a plasma display panel according to a first embodiment of the present invention.
Figure 3B:
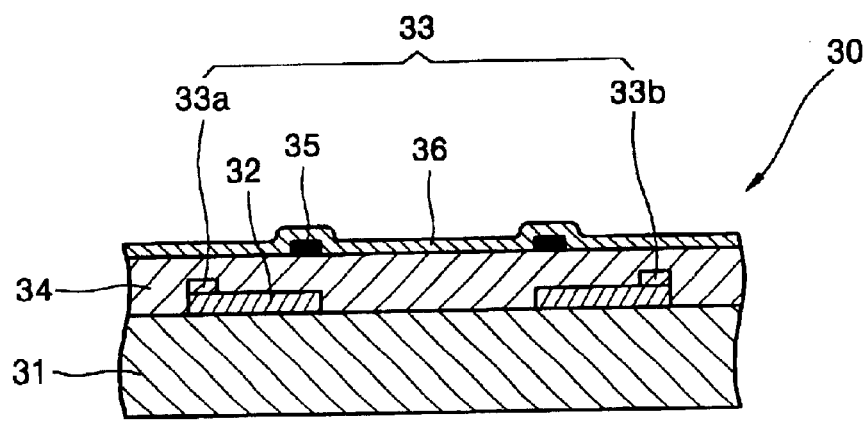
FIG. 3B is a cross section of the plasma display panel according to a first embodiment of the present invention.

FIG. 3A is an open-cut perspective view of a plasma display panel according to a first embodiment of the present invention. FIG. 3B is a cross section of the plasma display panel according to a first embodiment of the present invention.

Referring to FIG. 3A, in a front panel 30 of the plasma display panel according to the first embodiment of the present invention, transparent electrodes 32 are formed as strips on a glass substrate 31. Bus electrodes 33 are each formed as strips along the outer edge portion on each of the transparent electrodes 32. A dielectric layer 34 for covering the display electrodes 32 and the bus electrodes 33 is deposited on the glass substrate 31. Here, the bus electrodes 33 placed at the left side on the transparent electrodes 32 are referred to as scan electrodes 33a, and the bus electrodes 33 placed at the right side on the transparent electrodes 32 are referred to as sustain electrodes 33b.

Carbon nanotube strips 35 are aligned on the dielectric layer 34 such that they face the display electrodes 32. An MgO protective layer 36 is formed on the dielectric layer 34 while covering the carbon nanotube strips 35.

A rear panel 40 of the plasma display panel according to the first embodiment of the present invention has the same structure as the rear panel of a conventional plasma display panel. That is, in the rear panel 40, address electrodes 43 are aligned on a glass substrate 41. A dielectric layer 44 is deposited on the glass substrate 41 and the address electrodes 43. Barrier ribs 47 are formed as strips on the dielectric layer 44 and in parallel to the address electrodes 43 in order to define discharge cells. The sidewalls of the barrier ribs 47 and the surface of the dielectric layer 44 are coated with phosphors 48 to emit different color rays, such as red, green, and blue, from different discharge cells.

In a plasma display panel according to the present invention, an existing discharge gas and a conventional rear panel are still used, but the carbon nanotube strips 35 are locally printed on the dielectric layer 34 by pasting upon formation of a front panel.

The carbon nanotube strips 35 can be thin carbon nanotube strips or thick carbon nanotube strips. Thin carbon nanotube strips can be formed by chemical vapor deposition (CVD), such as plasma enhanced CVD (PECVD), thermal CVD (TCVD), or electron cyclotron resonance CVD (ECR CVD). Thick carbon nanotube strips can be formed by adding carbon nanotubes formed by arc discharge or a pyrorisis technique to a proper organic or inorganic binder to form a paste and then thickly printing the paste on a desired layer. Here, the pyrorisis technique is growing carbon nanotubes (CNT) by decomposing hydrogen carbide using heat in a state where a gas catalyzer is injected or a catalyzer other than the gas catalyzer exists.

The thin carbon nanotube strips have a lot of restrictions because they are only grown on a substrate of iron, cobalt, or nickel that have combining energy similar to the bond energy of carbon. Since it is difficult to grow the thin carbon nanotube strips on indium tin oxide (ITO) electrodes widely used as the display electrodes 32 for a plasma display panel, electrodes of a material other than ITO can be used as the display electrodes 32 to grow the thin carbon nanotube strips, however, in this case, transparency cannot be satisfied.

Accordingly, the thick carbon nanotube strips are used in a plasma display panel according to the present invention. Here, either single-wall or multi-wall carbon nanotubes are used.

The carbon nanotube strips 35 according to the first embodiment of the present invention are placed between the scan electrodes 33a and the sustain electrodes 33b and opposite to the display electrodes 32. The carbon nanotube strips 35 are placed close to and opposite to the bus electrodes 33. Particularly, a plasma display panel according to a second embodiment of the present invention, in which the carbon nanotube strips 35 are placed opposite to the bus electrodes 33, is shown in FIGS. 4A and 4B.

Figure 4A:
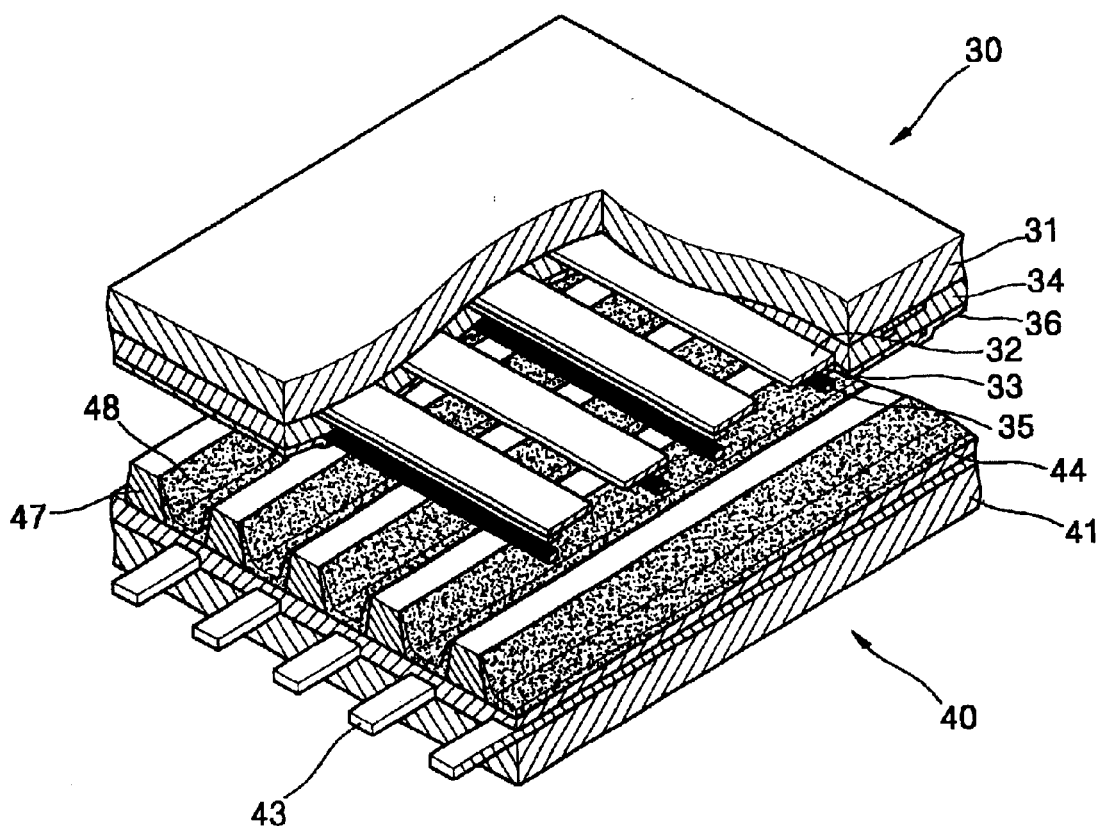
FIG. 4A is an open-cut perspective view of a plasma display panel according to a second embodiment of the present invention.
Figure 4B:
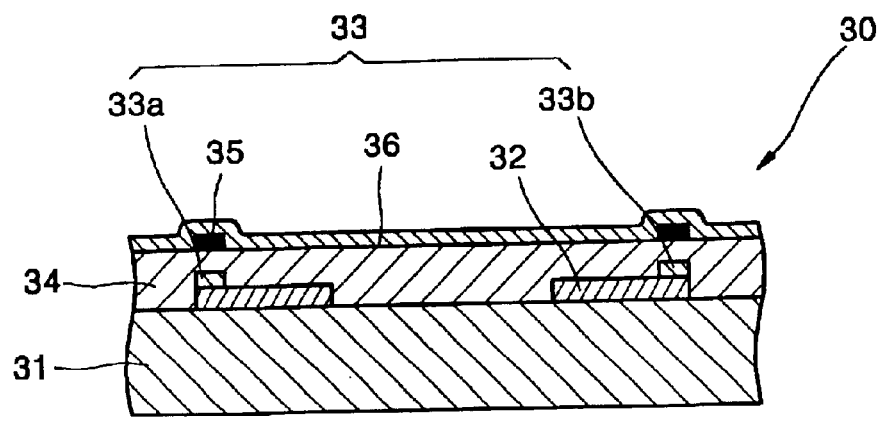
FIG. 4B is a cross section of a plasma display panel according to a second embodiment of the present invention.

FIG. 4A is an open-cut perspective view of a plasma display panel according to a second embodiment of the present invention. FIG. 4B is a cross section of a plasma display panel according to a second embodiment of the present invention.

The plasma display panel according to the second embodiment of the present invention is the same as that according to the first embodiment of the present invention except that the carbon nanotube strips 35 are aligned directly over the scan electrodes 33a and the sustain electrodes 33b.

In the plasma display panels according to the first and second embodiments of the present invention, the carbon nanotube strips 35 are each about 70–100 μm wide, the bus electrodes 33 are each about 60 μm wide, and the transparent electrodes 32 are about 300 μm wide.

On one hand, the carbon nanotube strips 35 printed on the dielectric layer 34 improve the secondary electron emission characteristics of a plasma display panel on the whole. On the other hand, the opaqueness of the carbon nanotube strips 35 prevents the color rays emitted from the phosphors 48 on the rear panel 40 from penetrating through the portions of the dielectric layer 34 that are covered by the carbon nanotube strips 35, thus reducing the luminescent area.

Accordingly, it is required to adequately control the rate of improvement in the secondary electron emission effect due to the formation of the carbon nanotube strips 35 on the dielectric layer 34 and the rate of decrease in the luminescent area depending on the area of the carbon nanotube strips 35.

To do this, the carbon nanotube strips 35 are formed between the scan electrodes 33a and the sustain electrodes 33b so that the carbon nanotube strips face the display electrodes 32, thereby maximizing the secondary electron emission effect. The area of the carbon nanotube strips 35 is adjusted not to exceed 10% of the area of the front panel.

A plasma display panel according to the present invention is an alternating current plasma display panel. In an alternating current plasma display panel, when alternate electric fields are applied to the bus electrodes 33 and the address electrodes 43, the electrons and positive ions of the front and rear panels alternate in the carbon nanotube strips 35 and the MgO protective layer 36. The moment when the electric fields alternate, electrons collide with the molecules of the neutral sealing gas within discharge cells, resulting in new electrons, ionized sealing gas, excited sealing gas atoms, and the like. The excited sealing gas atoms radiate while turning into the normal state and are restored to the neutral sealing gas atoms. The light emitted from the excited sealing gas atoms excites the phosphors formed on the inside walls of the discharge cells to emit three color rays of red, green and blue.

If the frequency of the alternate electric fields increases, the frequency of radiations increases and the amount of cumulative electric charge increases. Accordingly, discharge with a stabilized voltage can be achieved. The cumulative electric charge amount can be externally controlled by applying inverse pulse electric fields.

A method of manufacturing a plasma display panel according to the present invention will now be described with reference to FIG. 5. Most of the components of the plasma display panel according to the present invention are formed by paste printing.

Figure 5:
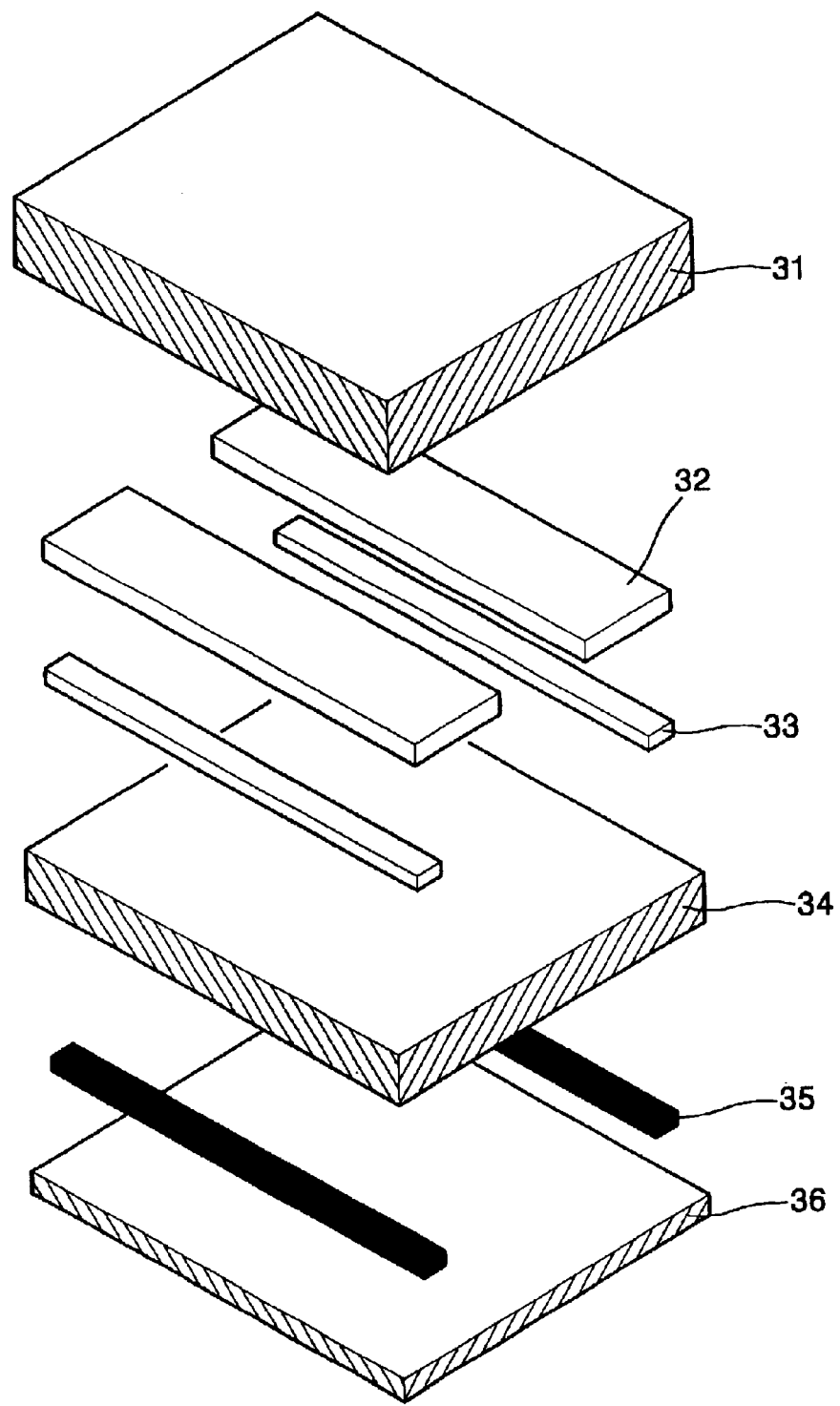
FIG. 5 is an exploded perspective view for explaining a method of manufacturing a plasma display panel according to the present invention.

Referring to FIG. 5, the transparent electrodes 32 are formed as strips on the glass substrate 31. Next, the bus electrodes 33 are each formed as strips along the outer edge of each of the transparent electrodes 32 such that the bus electrodes 33 are parallel to the transparent electrodes 32. Thereafter, the dielectric layer 34 is formed on part of the glass substrate 31, part of the transparent electrodes 32, and the bus electrodes 33. Subsequently, the carbon nanotube strips 35 are printed on the dielectric layer 34 such that they face the transparent electrodes 32. Finally, the upper surfaces of the dielectric layer 34 and carbon nanotube strips 35 are coated with the MgO protective layer 36 having good secondary electron emission characteristics.

The carbon nanotube strips 35 are generally weak for heat. Accordingly, if the carbon nanotube strips 35 are printed on the upper surface of the transparent electrodes 32, thick dielectric paste is printed on the carbon nanotube strips 35, and then the resultant structure is plasticized, the carbon nanotube strips 35 are oxidized and eliminated. Consequently, in order to prevent the carbon nanotube strips 35 from being oxidized, it is preferable that the dielectric layer 34 is formed of the thick dielectric paste and plasticized before the carbon nanotube strips 35 are printed.

Glass paste is used to form the dielectric layer 34 on which the carbon nanotube strips 35 are to be formed, the dielectric layer 44 of the rear panel, the display electrodes 32 below the dielectric layer 34, the glass substrates 31 and 41 on which the display electrodes are formed, and the barrier ribs 47 on the lower panel. The barrier ribs 47 are about 150 $\mu$m high. Either an inert gas, such as He, Ne, Ar, Kr, or Xe, or a sealing gas, such as Hg in metallic vapor, is injected into the discharge cells defined by the barrier ribs 47. The barrier ribs 47 can be in the shape of a stripe, a waffle, or the like.

The glass substrates 31 and 41 are manufactured by floating in order to have a relatively uniform flat surface. The transparent electrodes 32 are formed of tin oxide ($SnO_2$) or ITO. However, ITO, which is excellent in transparency, conductivity, and workability, is widely used.

The dielectric layers 34 and 44 are formed of dielectric paste, which is transparent and endurable for strong electric fields, to a thickness of about 20 $\mu$m on the glass substrates 31 and 41, respectively.

The electrodes of the panel are formed of conductive paste, such as silver (Ag), silver-paradium (Ag—Pd), or nickel (Ni). The MgO protective layer 36 is deposited on the dielectric layer 34 to a thickness of about 500 nm in order to increase the amount of cumulative electric charge and stabilize the discharge characteristics.

A plasma display panel generally uses phosphors that are capable of emitting useful quantities of radiation in the ultraviolet spectrums. Red phosphors include yttrium, gadolinium borate, and the like. Green phosphors include a compound of Zn2SiO4:Mn in which a manganese activator is mixed with a zinc silicate parent body. Blue phosphors include barium magnesium aluminates (Ba,Mg) $Al_{10}O_{17}$:Eu2.

The carbon nanotube paste used to form the carbon nanotube strips 35 is produced by equally mixing carbon nanotubes with an organic or inorganic binder. The organic binder is composed of an organic solvent and a polymer material, and the inorganic binder is formed of low boiling point frit, $SiO_2$, $B_2O_3$, or the like. The used organic solvent can be a high boiling point solvent having a low volatility at a room temperature, such as butyl cabitol acetate, α-terpineol, or ethylene glycol, or a compound of two or more materials among them. The polymer material can be polyvinyl alcohols, polyvinyl butyrals, acryllates, ethylcelluloids, nitrocelluloses, or a compound of two or more materials among them. The inorganic binder can be formed of one of a low boiling point slit (e.g., PbO), $SiO_2$, $B_2O_3$, and a compound of two or more of these materials. The carbon nanotube paste produced using these materials is printed on the dielectric layer 34 by screen printing, thereby forming the carbon nanotube strips 35.

Figure 6:
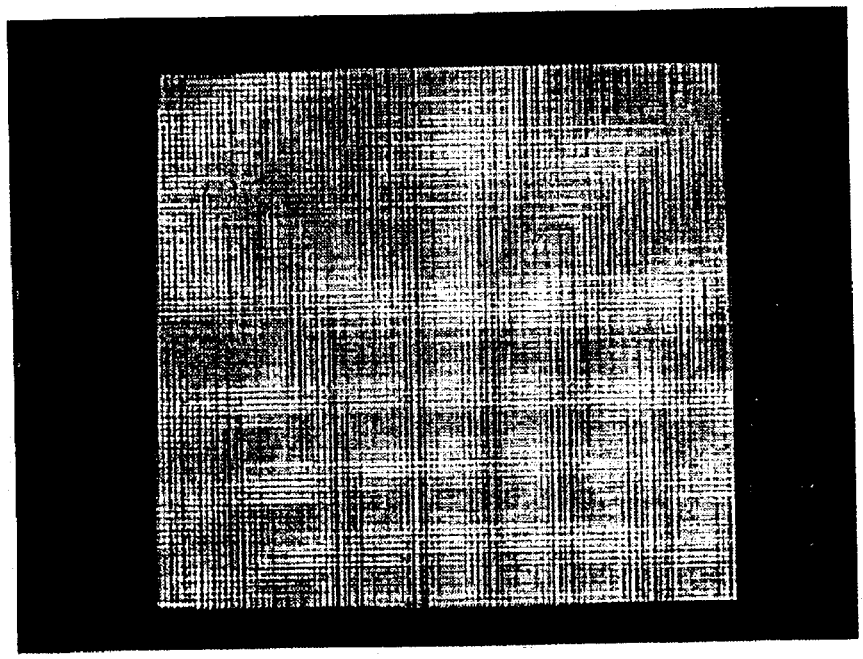
FIG. 6 is a picture for comparing the data discharge in a plasma display panel according to the present invention with that in a conventional plasma display panel.

FIG. 6 is a picture for comparing the data discharge in a plasma display panel according to the present invention with that in a conventional plasma display panel. Referring to FIG. 6, it can be recognized that the data discharge shape of the plasma display panel according to the present invention is similar to that of the conventional plasma display panel.

Figure 7:
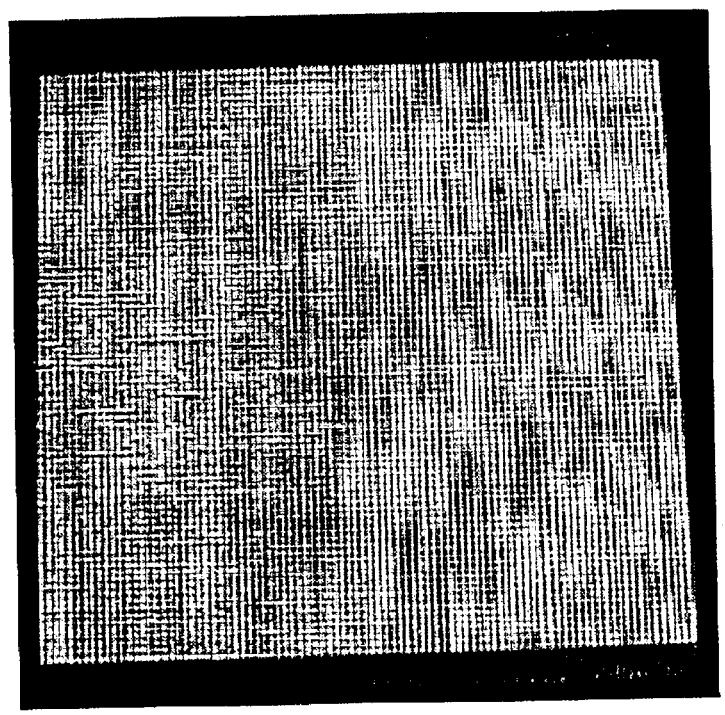
FIG. 7 is a picture for comparing the sustain discharge in a plasma display panel according to the present invention with that in a conventional plasma display panel.

FIG. 7 is a picture for comparing the sustain discharge in a plasma display panel according to the present invention with that in a conventional plasma display panel. Referring to FIG. 7, it can be recognized that the sustain discharge of the plasma display panel according to the present invention is greater than that of the conventional plasma display panel.

Figure 8A:
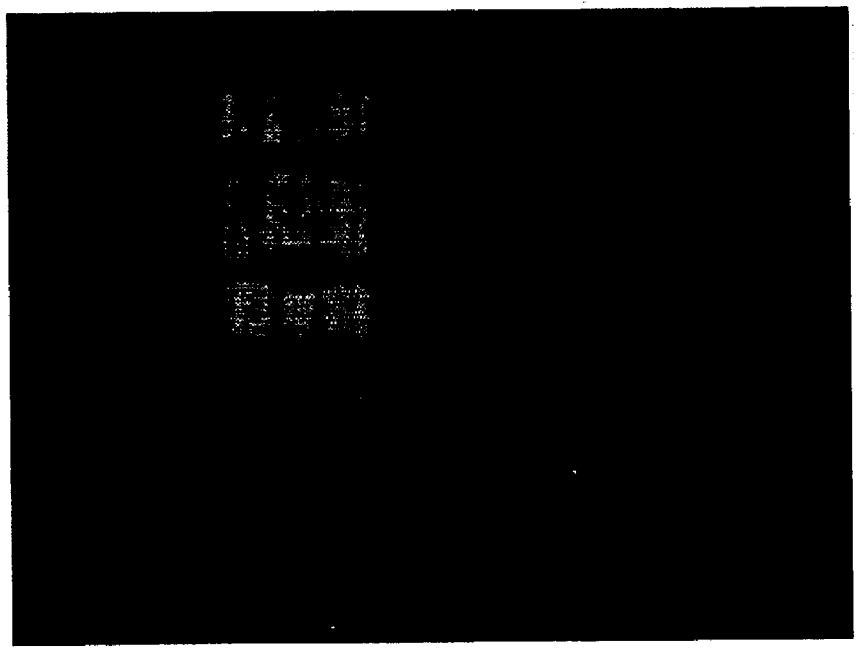
FIG. 8A is a magnified picture of the pixels at the bright portions on the plasma display panel according to the present invention shown in FIG. 7.
Figure 8B:
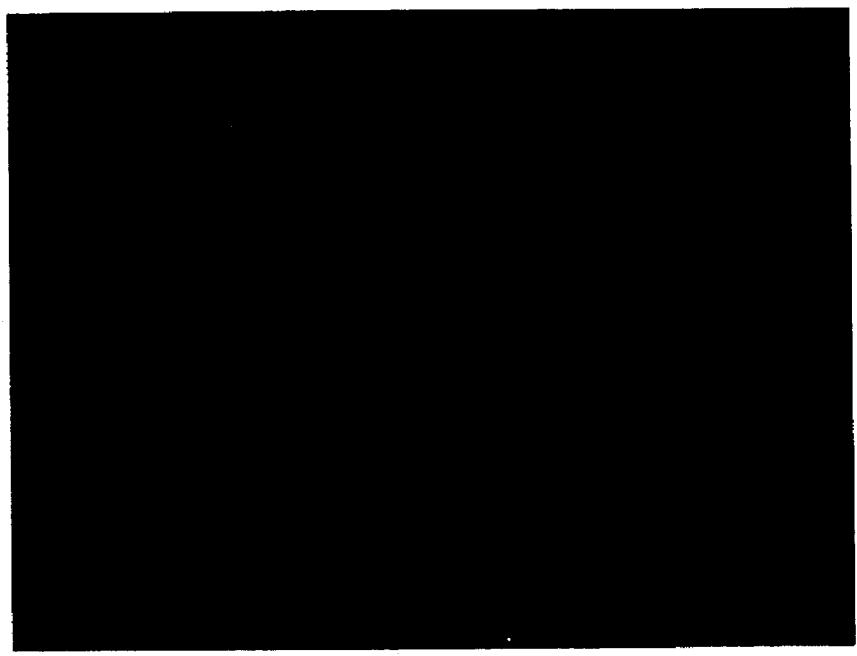
FIG. 8B is a magnified picture of the pixels at the bright portions on the conventional plasma display panel shown in FIG. 7.

FIG. 8A is a magnified picture of the pixels at the bright portions on the plasma display panel according to the present invention shown in FIG. 7. FIG. 8B is a magnified picture of the pixels at the bright portions on the conventional plasma display panel shown in FIG. 7. Referring to FIGS. 8A and 8B, it can be seen that the plasma display panel according to the present invention of FIG. 8A is brighter than the conventional plasma display panel of FIG. 8B.

A plasma display panel according to the present invention improves the secondary electron emission characteristics by the formation of carbon nanotubes on a dielectric layer, thus providing a high-quality display screen having a high luminous efficiency and a high contrast ratio.

While this invention has been particularly shown and described with reference to preferred embodiments thereof, it will be understood by those skilled in the art that various changes in form and details may be made therein without departing from the spirit and scope of the invention as defined by the appended claims.

For example, one of ordinary skill in the art to which the present invention pertains can properly control the area of carbon nanotubes so as to provide maximum luminous efficiency based on the technical spirit of the present invention. Therefore, it is to be understood that the scope of the invention must not be determined by the specific embodiments disclosed but by the technical spirit of the invention as defined by the appended claims.

As described above, in a plasma display panel according to the present invention and a method of manufacturing the front panel of the plasma display panel, carbon nanotubes having a good secondary electron emission characteristic are formed on a dielectric layer, thus providing high-quality pictures having high luminous efficiencies and high contrast ratios.

What is claimed is:

1. A plasma display panel having a front panel, the front panel comprising:

a glass substrate;

transparent electrodes formed as strips on the glass substrate;

bus electrodes each formed as strips along the outer edge on the upper surface of each of the transparent electrodes and in parallel to the transparent electrodes;

a dielectric layer formed on part of the glass substrate, parts of the transparent electrodes, and the bus electrodes;

carbon nanotube strips aligned on the dielectric layer such that the carbon nanotube strips face the transparent electrodes; and a protective layer formed on part of the dielectric layer and the carbon nanotube strips.

2. The plasma display panel of claim 1, wherein the area of the carbon nanotube strips is equal to or less than 10% of the area of the front panel.

3. The plasma display panel of claim 1, wherein the width of the carbon nanotube strips is about 70–100 $\mu$m.

4. The plasma display panel of claim 1, wherein the carbon nanotube strips are formed of one of single-wall carbon nanotubes and multi-wall carbon nanotubes.

* * * * *